United States Patent
Oizumi et al.

[11] Patent Number: 5,898,537
[45] Date of Patent: Apr. 27, 1999

[54] STORAGE DEVICE HAVING AN IMPROVED HOUSING STRUCTURE

[75] Inventors: Katuhiko Oizumi; Hirofumi Suzuki, both of Higashine, Japan

[73] Assignee: Fujitsu Limited, Kawasaki, Japan

[21] Appl. No.: 08/801,513

[22] Filed: Feb. 18, 1997

[30] Foreign Application Priority Data

Mar. 26, 1996 [JP] Japan .................................. 8-070568

[51] Int. Cl.⁶ .............................................. G11B 17/02
[52] U.S. Cl. ...................................................... 360/97.01
[58] Field of Search ........................ 360/97.01, 97.02, 360/97.03

[56] References Cited

U.S. PATENT DOCUMENTS

| | | | |
|---|---|---|---|
| 4,979,062 | 12/1990 | Stefansky et al. | 360/97.02 |
| 5,004,207 | 4/1991 | Ishikawa et al. | 360/97.02 |
| 5,029,026 | 7/1991 | Stefansky et al. | 360/97.02 |
| 5,214,549 | 5/1993 | Baker et al. | 360/97.02 |
| 5,243,495 | 9/1993 | Read et al. | 360/97.01 |
| 5,295,027 | 3/1994 | Elsing et al. | 360/97.02 |
| 5,453,890 | 9/1995 | Takegami et al. | 360/97.02 |
| 5,455,728 | 10/1995 | Edwards et al. | 360/97.03 |

FOREIGN PATENT DOCUMENTS

| | | |
|---|---|---|
| 64-46279 | 2/1989 | Japan . |
| 574126 | 3/1993 | Japan . |
| 5507170 | 10/1993 | Japan . |
| 714361 | 1/1995 | Japan . |

*Primary Examiner*—Robert S. Tupper
*Attorney, Agent, or Firm*—Greer, Burns & Crain, Ltd.

[57] ABSTRACT

The present invention relates to a storage device in which information is written and read using a head movable relative to a rotating disk medium encased in a housing. The housing has a base and a cover. Openings formed by a predetermined number of radial beams are provided in at least one of the cover and the base. Preferably, the beams extend between the periphery and a central area of the device.

16 Claims, 10 Drawing Sheets

STORAGE DEVICE HAVING AN IMPROVED HOUSING STRUCTURE

BACKGROUND OF THE INVENTION

The present invention relates to a housing for a storage device in which information is written and read using a head which is movable relative to a rotating disk medium, and more particularly, to a storage device having a housing which reduces thickness while maintaining strength.

DESCRIPTION OF THE RELATED ART

Many of the notebook computers and portable communication terminals recently available use small hard disk drives as self-contained storage devices. For example, hard disk drives accommodating a total of one to three 2.5-inch disk mediums are widely used. As computers in which these hard disk drives are installed become smaller and thinner, reductions in the size and weight of these hard disk drives are required.

Figure 11:
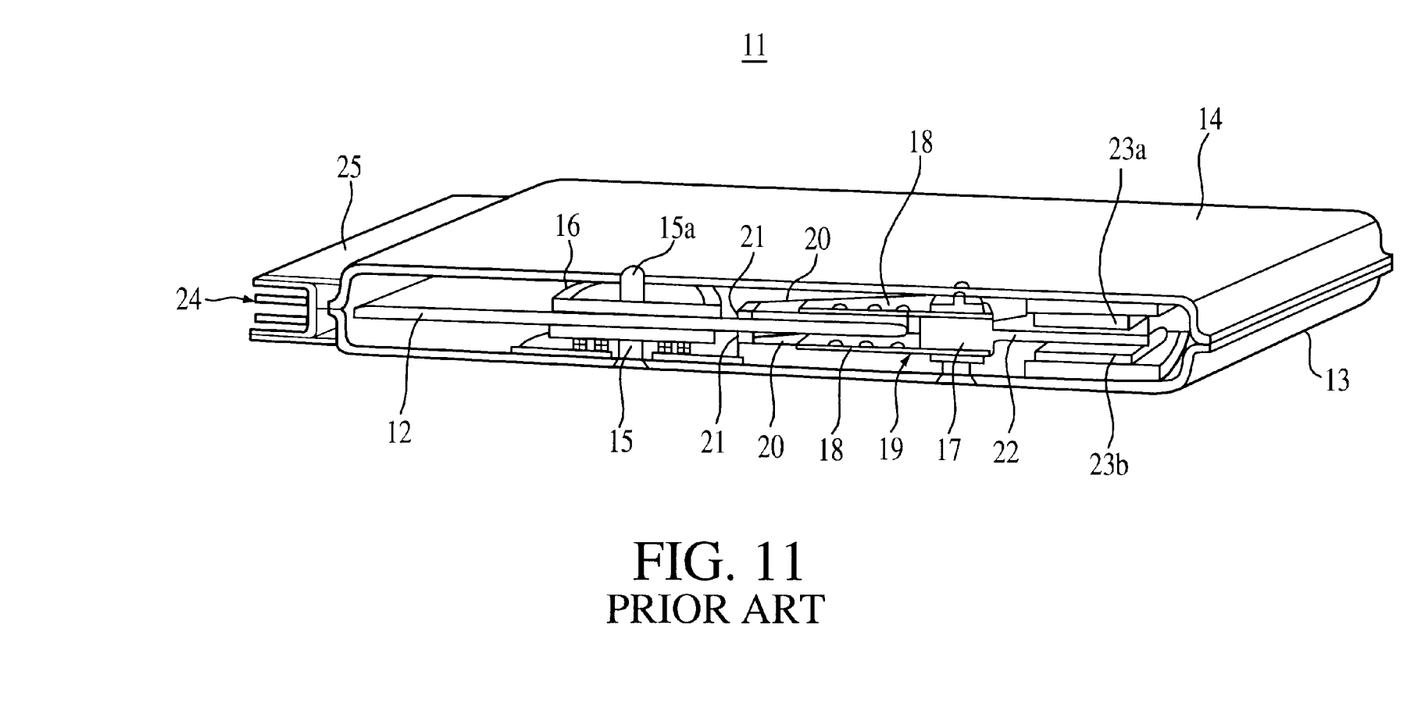
FIG. 11 is a perspective view of a conventional disk drive with parts removed.

FIG. 11 is a perspective view of a conventional disk drive with parts removed. A disk drive 11 shown in FIG. 11 is a magnetic disk drive accommodating one magnetic disk 12, for example. Referring to FIG. 11, a spindle motor 15 is provided on a bowl-like base 13 and accommodated in a space created between the base and a bowl-like cover 14. A magnetic disk 12 is secured to a spindle 15a of the spindle motor 15 by means of a damper 16.

A rotatable shaft 17 is also provided on the base 13. Two arms 18 are fitted on the shaft 17 so as to constitute an actuator 19. Each of the arms 18 is fitted with a gimbal 20 having at its end a magnetic head 21. One of the magnetic heads 21 faces an upper major surface of the magnetic disk 12, and the other of the magnetic heads 21 faces a lower major surface of the magnetic disk 12.

A support plate 22 is provided to be integral with the arm 18 and opposite to the magnetic head 21 with respect to the shaft 17. A moving coil (not shown) is provided in the support plate 22. A magnet 23a is fitted to a yoke provided in the cover 14 so as to be positioned above the moving coil; and a magnet 23b is fitted to a yoke provided in the base 13 so as to be located below the moving coil. The moving coil and the magnets 23a and 23b constitute a voice coil motor (VCM).

Outside an end of the casing formed by the base 13 and the cover 14 is a connector 25 having terminal pins 24 which transmit a control signal for driving the spindle motor 15 and the moving coil, and which further transmit signals to the magnetic head 21 to write and read information. The magnetic disk 12 is rotated by the spindle motor 15 at a predetermined speed. By supplying a predetermined control current to the moving coil, the magnetic head 21 is moved about the shaft 17 in a radial direction with respect to the magnetic disk 12. Thus, information is written or read at desired positions.

The disk drive 11 described above is not provided with a printed circuit board; rather it is connected to an external device via the connector 25. Therefore, the thickness of the disk drive 11 is determined by the thickness of the bowl-like base 13 and the bowl-like cover 14. Generally, the base 13 and the cover 14 are formed of die cast aluminum. The thickness of the base 13 and the cover 14 is set to a magnitude which ensures a certain durability against shock and torsion. For example, the thickness of the base 13 and the cover 14 may be set to 0.5 mm. In that case, the disk drive accommodating one magnetic disk 12 has a minimum thickness of about 5 mm. If a printed circuit board is built into the disk drive, the thickness of the disk drive is increased correspondingly by about 0.6–2.0 mm.

Reducing the thickness of the base 13 and the cover 14 in order to reduce the size and weight of the disk drive 11 causes the disk drive 11 to be less durable against shock and torsion. Moreover, oscillation caused by the rotation of the spindle motor 15 can result in an unstable positioning of the magnetic head 21 and an increase in noise. Increasing the durability by making the base 13 thick in an attempt to avoid problems such as the one caused by the oscillation of the spindle motor 15 results in less space in which the magnetic disk 12 is accommodated.

Japanese Laid-Open Patent Application No. 64-46279 and No. 5-507170 disclose embossing applied to a cover used in a magnetic disk drive for producing an irregular surface on the cover. The disclosed embossing is intended to improve rigidity and heat radiation, but results in a larger thickness of the disk drive.

The present invention has been developed in view of the above points and its object is to provide a magnetic disk drive having reduced thickness while maintaining durability.

Accordingly, one object of the present invention is to provide new and improved storage devices. More specifically, an object of the present invention is to provide a new and improved storage device having reduced thickness while maintaining strength. Another object is to provide new and improved housings for storage devices having reduced thickness with adequate strength.

SUMMARY OF THE INVENTION

According to one aspect of the present invention, a storage device having a mechanism for moving a head with respect to a recording medium is located within a housing having a base and a cover. At least one of the base and cover is provided with openings formed by a plurality of beams extending between a periphery of the device and a center area of the device. The rigidity of the beams in the direction of the thickness is relatively high, so it is possible to reduce the overall thickness of the storage device.

According to a second aspect of the present invention, the base and the cover can be formed of a metal by forging or the like, or of a plastic by molding or the like. Accordingly, it is easy to form openings between the beams. Additionally, the use of a plastic further reduces the weight of the device.

According to a third aspect of the present invention, a shaft or the like for rotating the disk medium can be supported by the base or by the cover and the base. Accordingly, the space for accommodating the internal mechanisms for operation of the disk can be minimized so that the thickness of the device can be further reduced.

According to a fourth aspect of the present invention, the shaft (translating means) for moving the head, and translation driving means are spaced from the beams, and the wiring connections are supplied to the shaft, the translating means, the translation driving means and the head by a flexible printed circuit board formed so as to extend along an associated beam. Accordingly, the interior space of the device is effectively utilized so that the thickness of the device can be still further reduced.

According to a fifth aspect of the present invention, first and second seal members cover openings provided in the cover and openings provided in the base, and a third seal member is provided around a periphery of a joint defined between the base and the cover. Accordingly, it is possible to hermetically seal the space inside the device without increasing the thickness of the device.

According to a sixth aspect of the present invention, a control circuit board for controlling the device is provided to serve as a seal member, a hermetically sealing member is provided on a mounting surface of the control circuit board, and the control circuit board has electronic components mounted thereon and located in respective openings formed in the base. Accordingly, it is possible to reduce the thickness of the device and to ensure that the device is hermetically sealed.

DETAILED DESCRIPTION

Figure 1:
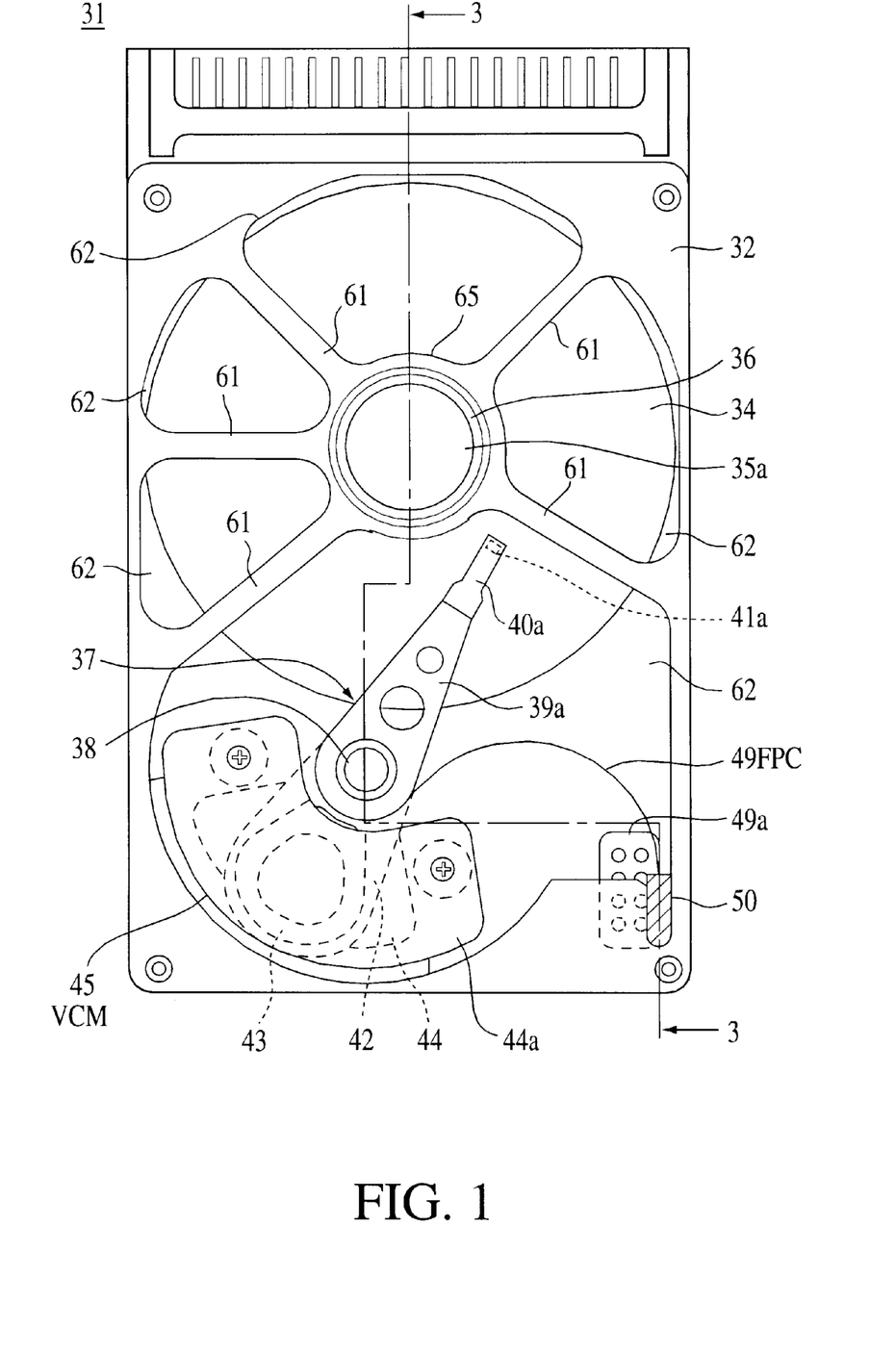
FIG. 1 is a top view showing the interior of a disk drive according to a first embodiment of the present invention.
Figure 2:
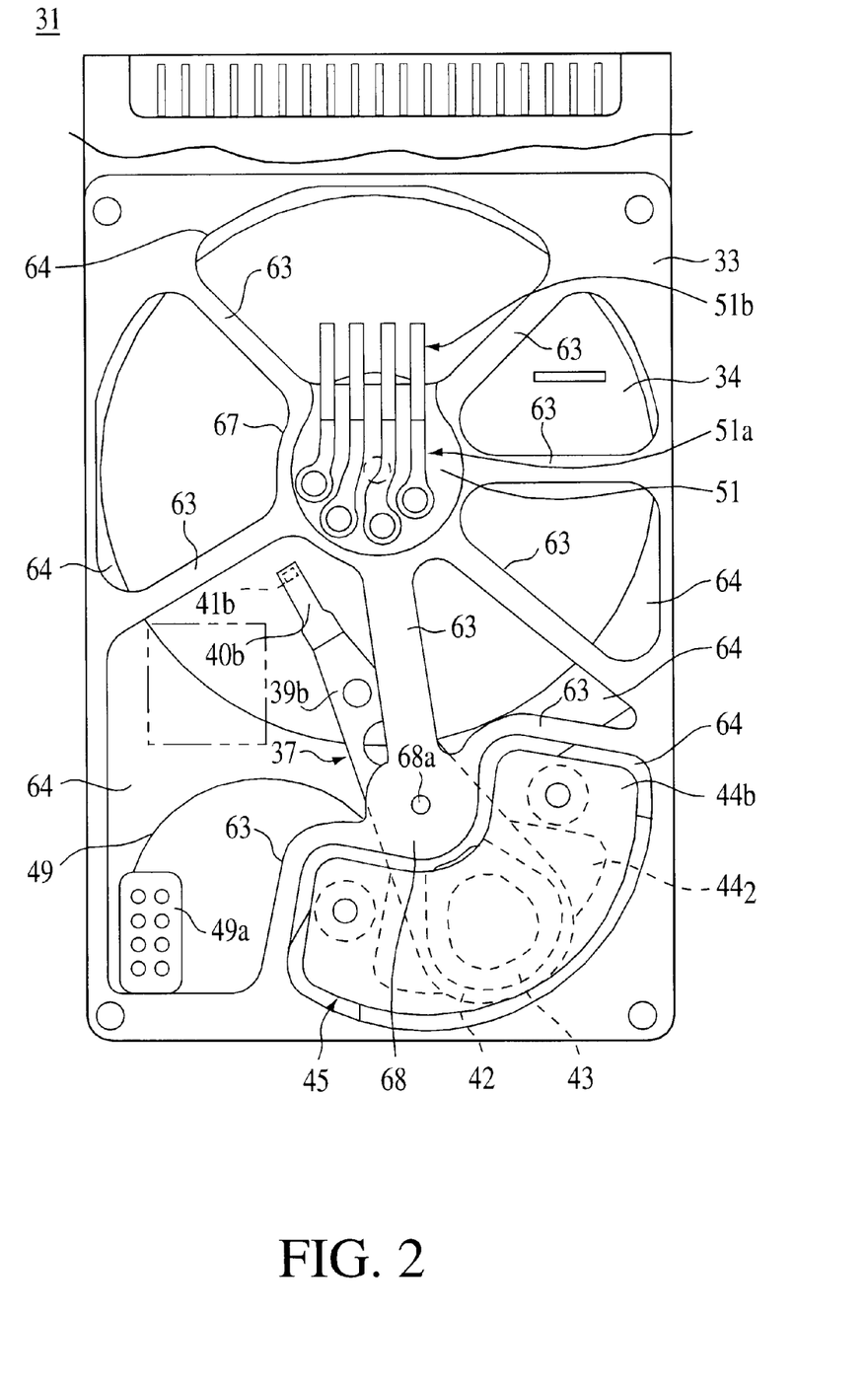
FIG. 2 is a bottom view showing the interior of the disk drive of FIG. 1.
Figure 3:
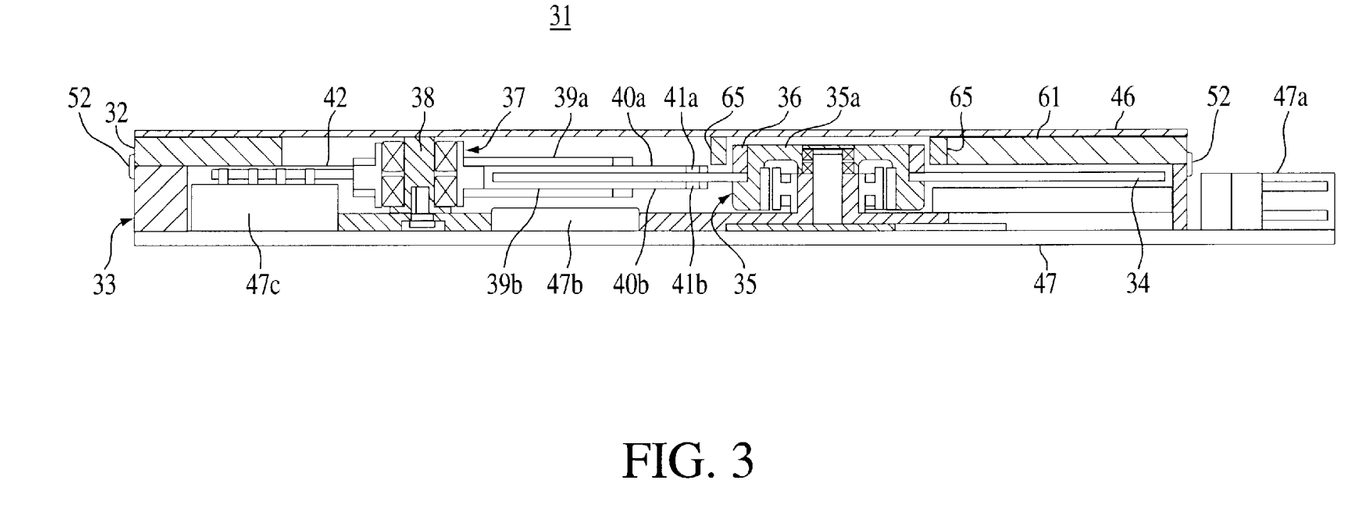
FIG. 3 is a longitudinal sectional view taken along line 3A-A of FIG. 1.
Figure 5:
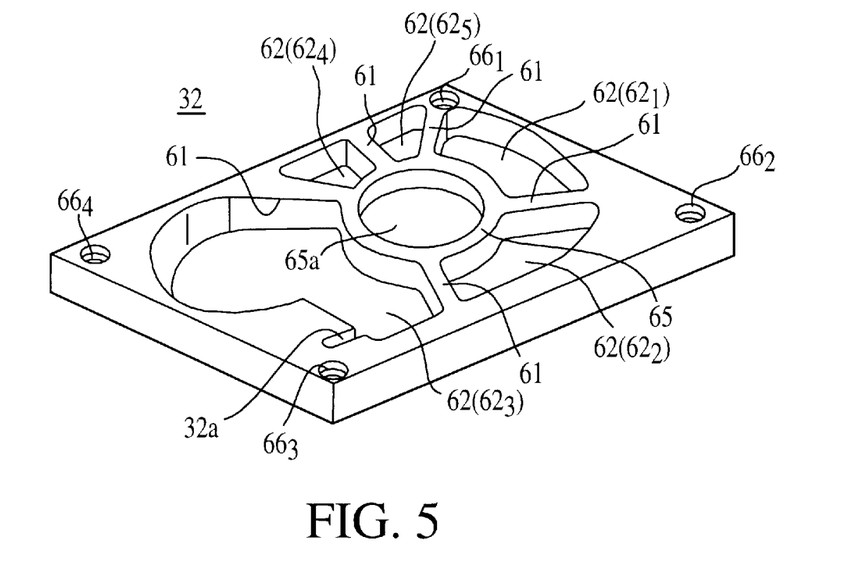
FIG. 5 is a perspective view of a cover of the disk drive of FIG. 1.
Figure 6:
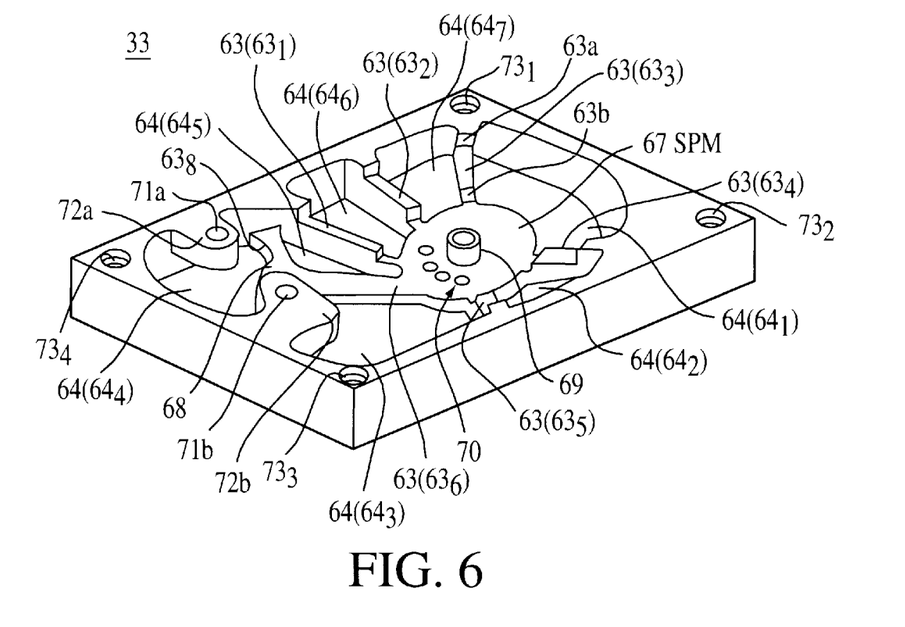
FIG. 6 is a perspective view of a base of the disk drive of FIG. 1.

In a disk drive 31 shown in FIGS. 1–3, a plurality of mechanisms are provided in a housing formed by a cover 32 and a base 33. As shown in FIG. 1, the cover 32 is constructed such that a predetermined number of beams 61 form a predetermined number of openings $62_1$–$62_5$. As shown in FIG. 2, the base 33 is constructed such that a predetermined number of beams $63_1$–$63_8$ form a predetermined number of openings 64. The detailed construction of the cover 32 and the base 33 is also depicted in FIGS. 5 and 6, respectively.

As shown in FIG. 3, a spindle motor 35 (rotating means) for rotating a magnetic disk 34 clamped thereon is located between the cover 32 and the base 33. The magnetic disk 34 is engaged with an extended portion of a motor hub 35a of the spindle motor 35 and is clamped by a damper 36 (described later in detail).

An actuator 37 (translating means) is rotatably connected to a shaft 38 so as to also be located between the cover 32 and the base 33. The actuator 37 is constructed such that gimbals 40a and 40b are fitted at an end of arms 39a and 39b, respectively. The ends of the gimbals 40a and 40b are provided with magnetic heads 41a and 41b, respectively. The magnetic heads 41a and 41b are responsible for writing information to and reading information from respective recording surfaces of the magnetic disk 34. The magnetic head 41a, the arm 39a and the gimbal 40a face one of the recording surfaces of the magnetic disk 34; and the magnetic head 41b, the arm 39b and the gimbal 40b face the other of the recording surfaces of the magnetic disk 34.

Referring back to FIGS. 1 and 2, a support part 42 is secured to the shaft 38 so as to lie opposite to the magnetic heads 41a and 41b with respect to the shaft 38. A flat voice coil 43 is provided in an opening formed in the support part 42 so that the windings lie substantially in the horizontal direction. An upper yoke 44a to which a magnet $44_1$ is attached is positioned above the voice coil 43; and a lower yoke 44b to which a magnet $44_2$ is attached is positioned below the voice coil 43. The voice coil 43 and the magnets $44_1$ and $44_2$ constitute a voice coil motor (VCM) 45 (translation driving means). By passing a predetermined current in the voice coil 43, the actuator 37 is rotated around the shaft 38 so that the magnetic heads 41a and 41b are translated in a radial direction of the magnetic disk 34 to predetermined positions.

Figure 4:
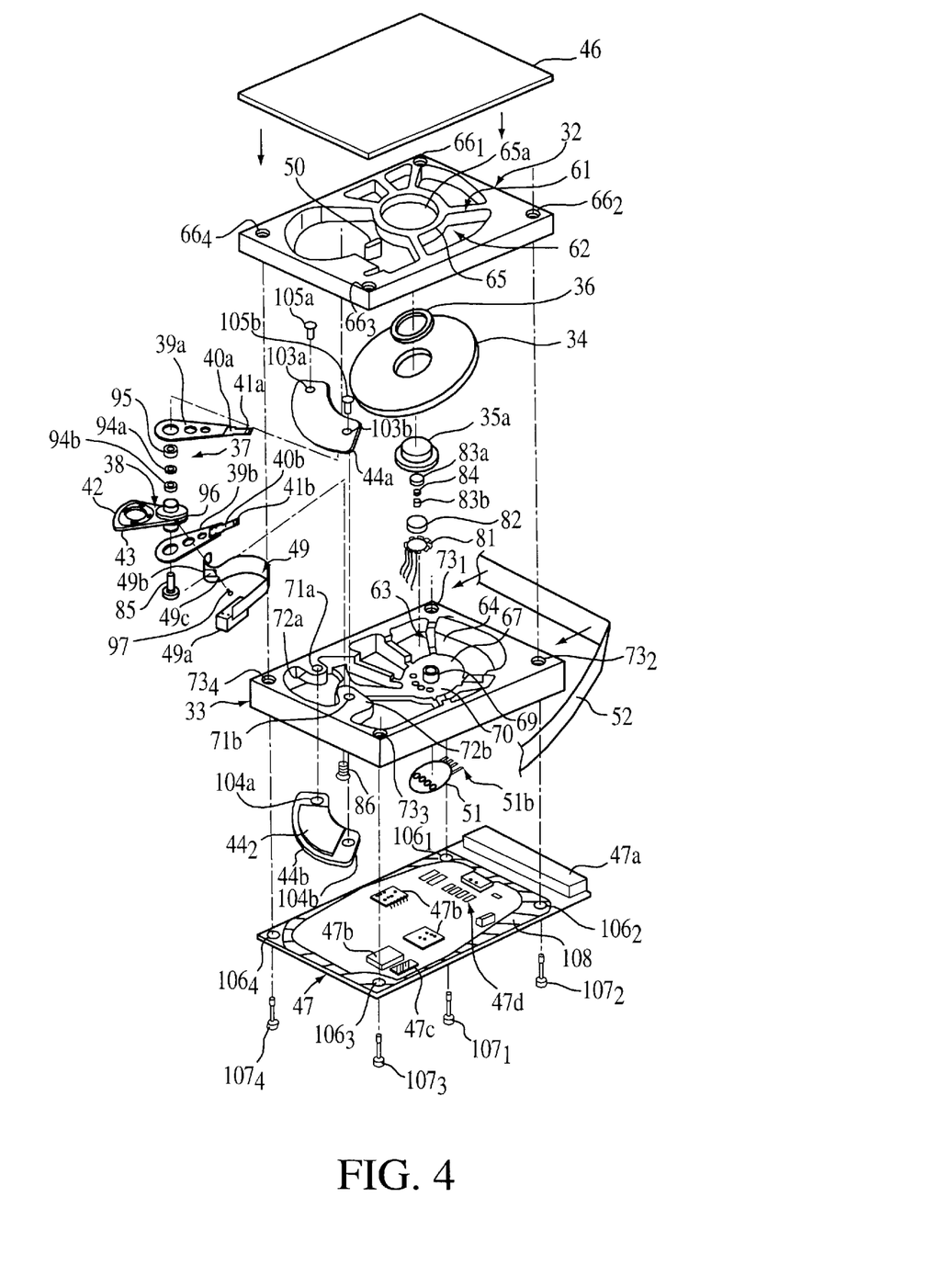
FIG. 4 is an exploded perspective view of the disk drive of FIG. 1.

Referring now to FIG. 4, a seal member 46 (first seal member) formed from an aluminum sheet and having an adhesive applied to one of its surfaces is provided on top of the cover 32. A printed circuit board 47 (second seal member) is secured to the base 33 by screws (not shown). The printed circuit board 47 controls the entire disk drive and is formed to extend outside the housing formed by the cover 32 and the base 33. The extension of the printed circuit board 47 is provided with a terminal part 47a connected to a host (for example, notebook personal computer). An IC 47b and a connector 47c may be mounted on the printed circuit board 47. Those electronic components (such as the IC 47b and the connector 47c) that are mounted within an area defined by the base 33 may be located inside the openings 64 when the printed circuit board 47 is secured to the base 33.

The actuator 37 is connected to a flexible printed circuit board (FPC) 49 on which is formed a wiring connection for supplying a current to the voice coil 43 and a wiring connection for exchanging signals with the magnetic heads 41a and 41b. The end of the FPC 49 is provided with a connector 49a connected to the connector 47c mounted on the printed circuit board 47. A rubber bushing 50 is fitted inside a recess 32a (FIG. 5) formed in the cover 32 so as to maintain the FPC 49 secured to the connector 47c.

A terminal plate 51 is provided beneath the base 33 in alignment with the spindle motor 35. Each piece of a pattern 51a (FIG. 2) formed on the terminal plate 51 has one end thereof connected to a motor stator (wiring) of the spindle motor 35 (FIG. 3). A terminal 51b (FIG. 2) having a configuration of a blade spring is fitted to the other end of the piece of the pattern 51a. The terminal 51b is engaged with pattern terminals (described later) of the printed circuit board 47 (FIGS. 3–4) and electrically connected therewith.

As shown in FIGS. 3 and 4, the joint between the cover 32 and the base 33 is girdled by a tape-like aluminum seal member 52 (third seal member) adhesively attached to the cover 32 and the base 33. The housing formed by the cover 32 and the base 33 is hermetically sealed by the seal member 46, the printed circuit board 47 and the seal member 52.

FIG. 4 shows an exploded perspective view of the disk drive of FIG. 1. FIG. 4 shows the seal member 46, the cover 32, the base 33 and the printed circuit board 47 from top to bottom in the stated order.

FIG. 5 is a perspective view of the cover of the disk drive of FIG. 2; and FIG. 6 is a perspective view of the base of the disk drive of FIG. 1. The cover 32 may be formed of a metal plate (such as a die-cast aluminum) of a thickness of 2 mm. As shown in FIG. 5, a ring-like support beam 65 is formed in the cover 32 in alignment with the center of the magnetic disk 34 (FIG. 4) accommodated in the disk drive. For example, five radial beams 61 integral with the support beam 65 lead therefrom toward the periphery of the cover 32. That is, each of the beams 61 lies between the periphery of the cover 32 and the general center area thereof. The support beam 65 and the beams 61 may have a thickness of 2 mm.

The beams 61 form openings $62_1$–$62_5$ around the support beam 65. The recess 32a with which the aforementioned bushing 50 is engaged is formed in the opening $62_3$. The four corners of the cover 32 are provided with threaded holes $66_1$–$66_4$.

The base 33 may be formed of a metal plate (such as a die-cast aluminum) of a thickness of 2.4 mm. As shown in FIG. 6, a SPM support part 67 is formed in the base 33 for alignment with the spindle motor 35. For example, six radial beams $63_1$–$63_6$ integral with the SPM support part 67 lead therefrom toward the periphery of the base 33. Each of the radial beams $63_1$–$63_5$ descends toward the bottom in two steps (see 63a and 63b) so that the radial beams $63_1$–$63_5$ become thicker toward the periphery. In this way, the joint between the base 33 and the cover 32 is made relatively thick. In other words, those portions of the base 33 that are not provided with components are made relatively thick so that the rigidity of the cover 32 and the base 33 is improved.

The beam $63_6$ is integral with an actuator support part 68. Two beams $63_7$ and $63_8$ (FIG. 2) extend from the actuator support part 68 toward the periphery. The beams $63_6$–$63_8$ and the actuator support part 68 are formed to have the same thickness as that of the SPM support part 67.

The openings 64 include individual openings $64_1$–$64_7$ formed around the SPM support part 67 by the beams $63_1$–$63_8$. A space formed above those portions of the base 33 that are thicker than the peripheral portions accommodate mechanisms described later.

The SPM support part 67 (FIG. 6) is provided with a shaft 69 and four holes 70 through which wiring for the motor stator is passed. A hole 68a (see FIG. 2) for supporting the shaft 38 (see FIG. 1) of the actuator 37 is formed in the actuator support part 68 (FIG. 2). Further, yoke fitting parts 72a and 72b (FIG. 6) having holes 71a and 71b, respectively, are formed in the opening $64_4$. Accordingly, the magnetic circuit is located in the openings $62_1$–$62_5$. The four corners of the base 33 are provided with holes $73_1$–$73_4$.

The cover 32 and the base 33 may be formed of a metal by forging, press-fitting or extrusion. Alternatively, the cover 32 and the base 33 may be formed of a plastic by molding or extrusion. The cover 32 and the base 33 need not be formed of the same material but may be formed of different materials depending on the requirement for rigidity and weight. While the configuration created by the openings $62_1$–$62_5$ and 64 formed by the beams 61 and 63, respectively, may be complex, forming of the cover 32 and the cover 33 is easy. Since the mechanisms are accommodated in the openings $62_1$–$62_5$ and 64, the thickness of the disk drive is largely determined by the thickness of the cover 32 and the base 33. Another advantage of forming the openings $62_1$–$62_5$ and 64 is that the weight of the disk drive can be reduced.

Referring back to FIG. 4, a stator motor 81 including four coil sections corresponding to respective phases is provided outside the shaft 69 on the SPM support part 67 in the base 33. Each of the wirings leading from the coils of the stator motor 81 is made to pass through the respective hole 70 and is connected to the end of the respective piece of the pattern 51a (FIG. 2) of the terminal plate 51. A magnet 82 (FIG. 4) is adhesively fitted inside the motor hub 35a. A bearing 83a, a bearing spacer 84 and a bearing 83b are shrinkage-fitted inside the magnet 82 so as to cover the shaft 69 and the stator motor 81. A central hole of the magnetic disk 34 is provided on the motor hub 35a. The magnetic disk 34 is secured to the motor hub 35a such that the damper 36 is shrinkage-fitted to the motor hub 35a.

The motor hub 35a is accommodated in an opening 65a formed by the support beam 65 such that no space is created between the motor hub 35a and the support beam 65. This open-sided support of the SPM 35 ensures that the SPM 35 can be positioned using the thickness of the cover 32, resulting in a reduced height of the disk drive. A shaft 85 is made to pass through the hole 68a (FIG. 2) in the actuator support part 68 of the base 33. The shaft 85 (FIG. 4) is rotatably fitted to the shaft 38 (FIG. 1) of the actuator 37 by a screw 86 (FIG. 4).

Figure 7:
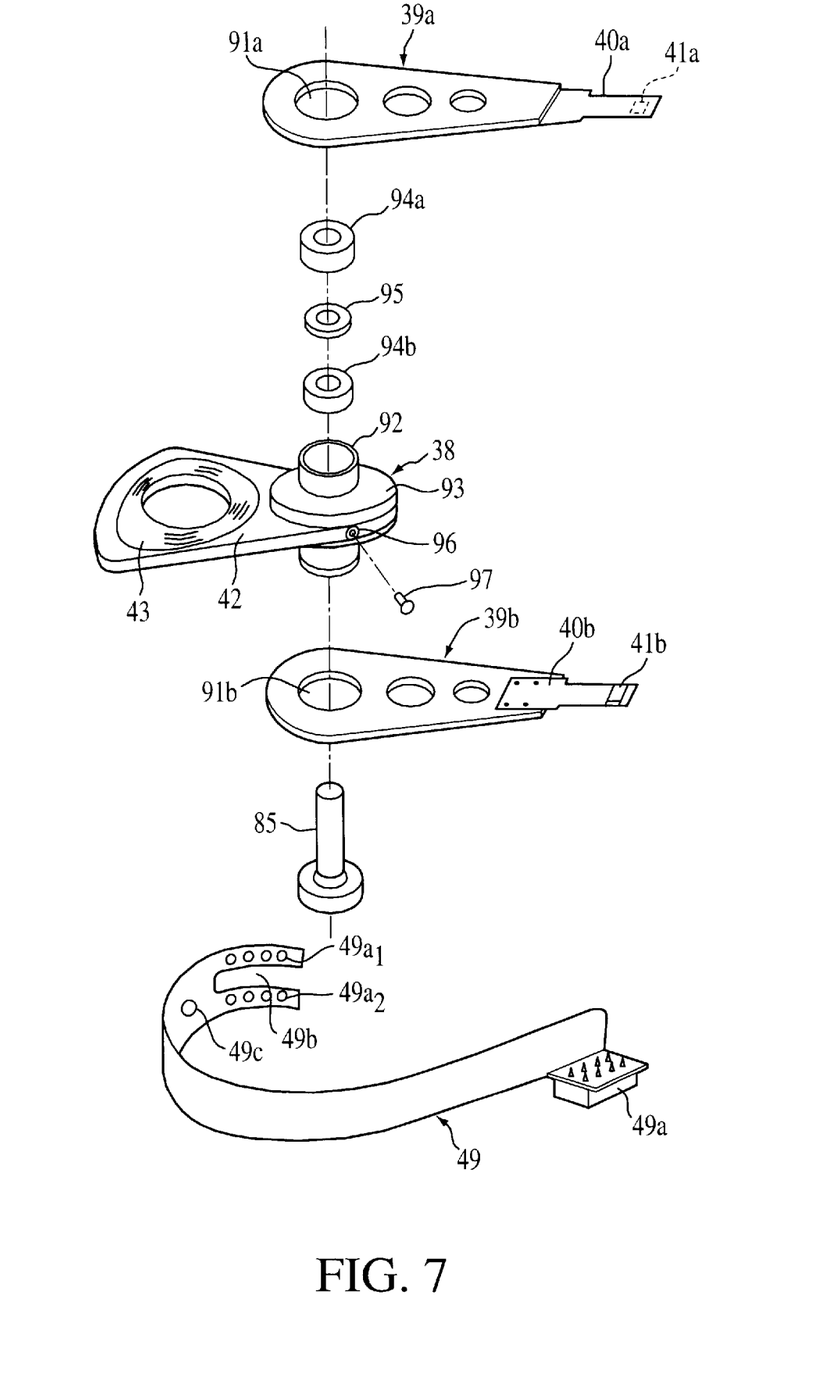
FIG. 7 is an exploded perspective view of an actuator assembly shown in FIG. 4.
Figure 8A:
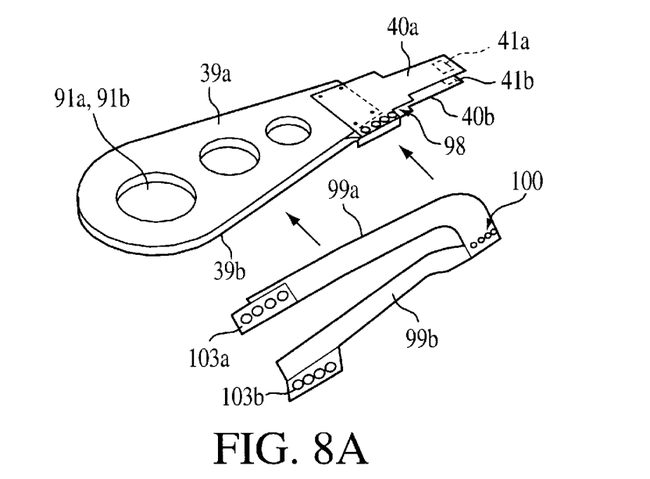
FIGS. 8(A)–(C) are views of an actuator shown in FIG. 4.
Figure 8B:
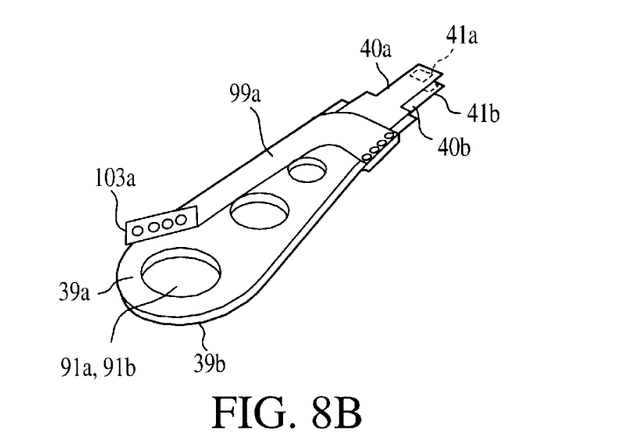
Figure 8C:
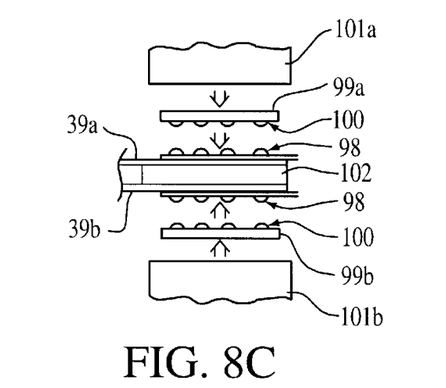

FIG. 7 is an exploded perspective view of an actuator assembly shown in FIG. 4. FIGS. 8(A) and (B) are perspective views of an actuator shown in FIG. 4. FIG. 8(C) is a sectional view showing how relay FPCs are attached to respective patterns. Referring to FIGS. 7, 8(A), 8(B) and 8(C), the arms 39a and 39b are provided on one end thereof with through holes 91a and 91b, respectively. The gimbals 40a and 40b are formed at the other end of the arms 39a and 39b, respectively, by spot welding. The magnetic heads 41a and 41b are adhesively fitted to the end of the gimbals 40a and 40b, respectively. Appropriate holes are formed in the arms 39a and 39b for reduction of weight. As will be described with reference to FIGS. 8(A), 8(B) and 8(C), relay FPC's 99a, 99b for connecting the magnetic heads 41a and 41b with the FPC 49 are connected to the arms 39a and 39b, respectively.

As shown in FIG. 7, the shaft 38 comprises a hollow shaft 92 and a body 93. The body 93 is integral with the support part 42 to which the voice coil 43 is fitted. A bearing 94a, a bearing spacer 95 and a bearing 94b are press-fitted inside the hollow shaft 92. The holes 91a and 91b of the arms 39a and 39b, respectively, are engaged with and welded to the hollow shaft 92 so as to sandwich the body 93. The shaft 85 is introduced from below the actuator support part 68 (FIG. 2) of the base 33 and rotatably press-fitted to the bearings 94a (FIG. 7) and 94b, and the bearing spacer 95.

A hole 96 is formed in the body 93 of the shaft 38. A groove 49b and a hole 49c are formed at an end of the FPC 49 opposite to the connector 49a. The FPC 49 is properly wound around the body 93 because the groove 49b allows the support part 42 to move therethrough. The FPC 49 is adhesively attached to the body 93 using a double-sided adhesive tape 108 (FIG. 4) or the like. The FPC is fitted to the body 93 by threading a screw 97 into the holes 49c and 96.

Referring to FIG. 8(A), a pattern (not shown) that leads from the magnetic head 41a is formed on the gimbal 40a; and a pattern (not shown) that leads from the magnetic head 41b is formed on the gimbal 40b. Four solder bumps 98 corresponding to pattern terminals are formed on the gimbal 40a (the solder bumps 98 on the gimbal 40b are not shown in FIG. 8(A)). Corresponding solder bumps 100 are formed on relay FPCs 99a and 99b connecting the patterns to the FPC 49 (the solder bumps 100 on the relay FPC 99b are not shown in FIG. 8(A)). As shown in FIG. 8(C), the relay FPCs 99a and 99b are attached to the respective patterns using soldering chips 101a and 101b, a jig 102 being interposed between the arms 39a and 39b.

Terminal parts 103a and 103b formed at the other end of the relay FPCs 99a and 99b are connected to terminal parts $49a_1$ (FIG. 7) and $49a_2$ near the groove 49b in the FPC 49.

Referring back to FIG. 4, the actuator 37 is accommodated in the opening $64_4$ of the base 33 shown in FIG. 6. The upper yoke 44a is provided with holes 103a and 103b, and the magnet $44_1$ is attached to the upper major surface of the yoke fitting parts 72a and 72b; the lower yoke 44b is provided with-threaded holes 104a and 104b, and the magnet $44_2$ is attached to the lower major surface of the yoke fitting parts 72a and 72b. A screw 105a threaded into the holes 103a, 71a and 104a secures the upper and lower yokes 44a and 44b to the yoke fitting parts 72a; and a screw 105b threaded into the holes 103b, 71b and 104b secures the upper and lower yokes 44a and 44b to the yoke fitting parts 72b.

The printed circuit board 47 is constructed such that predetermined patterns are formed on the surface(s) of a substrate having a thickness of 0.6 mm, for example, electronic components such as the terminal part 47a, the IC 47b and the connector 47c being mounted on the printed circuit board 47. A pattern terminal 47d is formed on the printed circuit board 47 in alignment with the terminal 51b having a configuration of a blade spring and provided in the terminal plate 51 fitted to the back of the base 33. The four corners of the printed circuit board 47 are provided with holes $106_1$–$106_4$ for coupling the printed circuit board 47 to the base 33. A double-sided adhesive tape 108 (hermetically sealing member) is provided on the printed circuit board 47 for hermetically sealing a space created by the printed circuit board 47 and the base 33.

A screw $107_1$ threaded into the holes $106_1$, $73_1$ and $66_1$ in the stated order, a screw $107_2$ threaded into the holes $106_2$, $73_2$ and $66_2$ in the stated order, a screw $107_3$ threaded into the holes $106_3$, $73_3$ and $66_3$ in the stated order, and a screw $107_4$ threaded into the holes $106_4$, $73_4$ and $66_4$ in the stated order ensure that the base 33, the cover 32 and the printed circuit board 47 are secured to each other. The seal member 46 is adhesively attached to the upper major surface of the cover 32. The joint between the cover 32 and the base 33 is girdled by a tape-like aluminum seal member 52 adhesively attached to the cover 32 and the base 33. The housing formed by the cover 32 and the base 33 is hermetically sealed by the seal member 46, the printed circuit board 47 and the seal member 52.

The terminal 51b of the terminal plate 51 establishes an electric contact with the pattern terminal 47d of the printed circuit board 47. Those electronic components (such as the connector 47c) mounted on the printed circuit board 47 and having a certain height are positioned in the respective openings of the base 33. The openings $62_1$–$62_5$ and 64 are also taken advantage of by disposing the FPC 49 along the beam 63 of the base 33.

In the magnetic disk drive 31 having the above-described construction, the seal member 46 may have a thickness of about 20 μm, the cover 32 about 2 mm, the base 33 about 2.4 mm, and the printed circuit board about 0.6 mm, so that the thickness of the entire disk drive is about 5 mm. A reduction in the thickness is achieved in comparison with the conventional disk drive as shown in FIG. 1 having a thickness of about 5 mm without the printed circuit board.

While the cover and the base of the conventional magnetic disk drive shown in FIG. 1 are bowl-like, producing a hollow structure when coupled to each other, the cover 32 and the base 33 of the present invention are provided with beams 61 and 63, respectively so that rigidity against torsion and oscillation is improved. The rigidity provided by such a structure may be great enough to further reduce the thickness of the disk drive. The increase in the rigidity reduces a level of oscillation caused in the base 33 by the spindle motor 35 and improves precision with which a servo track write (STW) operation can be performed.

The openings $62_1$–$62_5$ and 64 formed in the cover 32 and the base 33, respectively, can be effectively utilized to accommodate components, contributing to a reduction in the weight of the disk drive. By forming one of the cover 32 and the base 33 of a plastic if the requirement for rigidity permits, a further reduction in the weight is possible.

In further accordance with the present invention, the disk drive having a hermetically sealed structure can be easily produced. Since plate members that are necessary in the conventional hermetically sealed structure are unnecessary, the thickness can be reduced accordingly.

Figure 9:
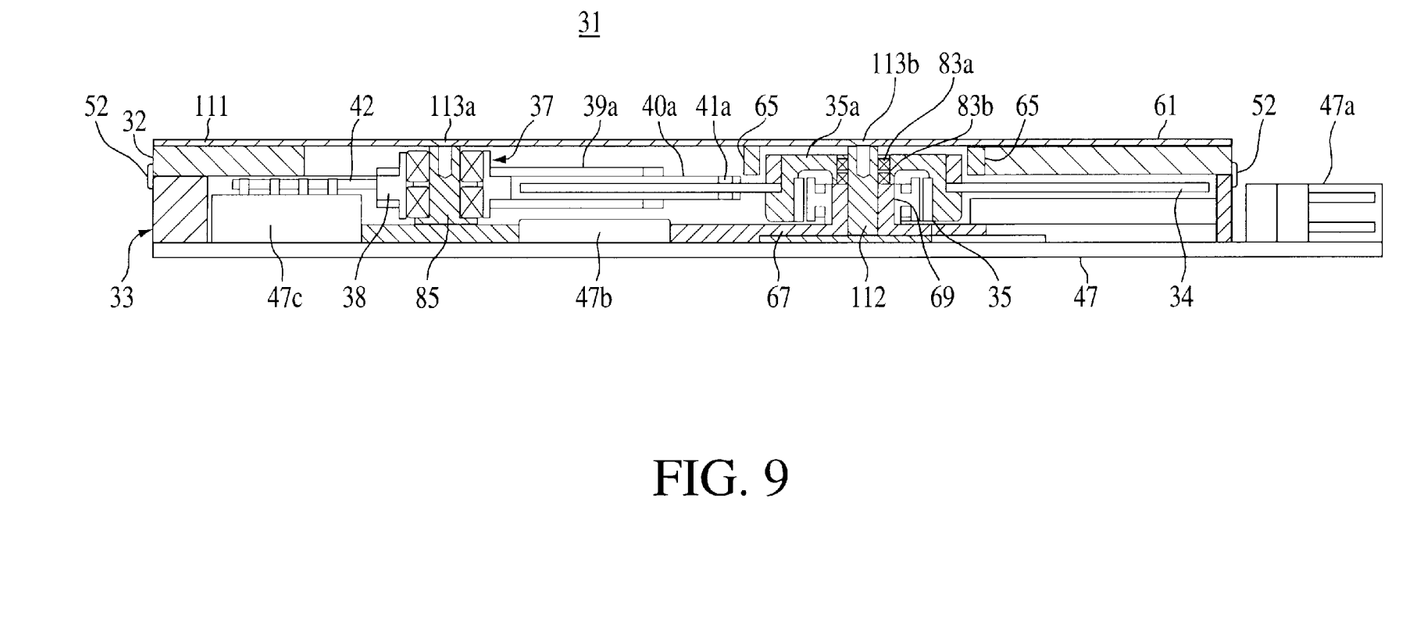
FIG. 9 is a longitudinal sectional view of a disk drive according to a second embodiment.

FIG. 9 is a longitudinal sectional view of a disk drive according to a second embodiment. The sectional view of FIG. 9 showing a magnetic disk drive 31 corresponds to the A—A sectional view of FIG. 1. Those components that are the same as the components of FIG. 1 are designated by the same reference numerals. In the magnetic disk drive 31 of FIG. 9, the seal member 46 is replaced by a seal plate 111 formed of a material having a certain rigidity. For example, the seal plate 111 is formed of a metal plate (or a plastic) such as aluminum having a thickness of 0.5 mm. The seal plate 111 may be adhesively attached to the cover 32. The cover 32 may have a thickness of 1.5 mm, for example.

In this case, the screw 86 not only secures the shaft 85 to the base 33 but also a screw 113a fixes the shaft 85 to the seal plate 111. An internal shaft 112 is shrinkage-fitted inside the shaft 69 formed in the SPM support part 67 of the base 33. The upper end of the internal shaft 112 is fixed to the seal plate 111 using a screw 113b. The other aspects of the disk drive 31 are the same as the corresponding aspects of the disk drive 31 according to the first embodiment.

Since the shafts for the actuator 37 and the spindle motor 35 are secured both to the base 33 and the seal plate 111 of the cover 32, the magnetic disk drive 31 according to the second embodiment is characterized by a reduced oscillation occurring when the magnetic disk 34 is rotated. The thickness of the entire disk drive may be as small as 5 mm. Thus, reduction of the thickness and securing rigidity can be achieved.

Figure 10A:
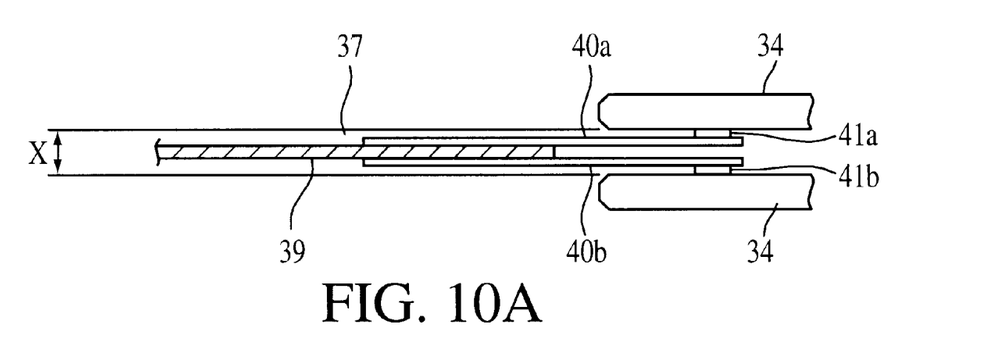
FIGS. 10(A)–(B) are diagrams depicting a portion of a disk drive according to a third embodiment.
Figure 10B:
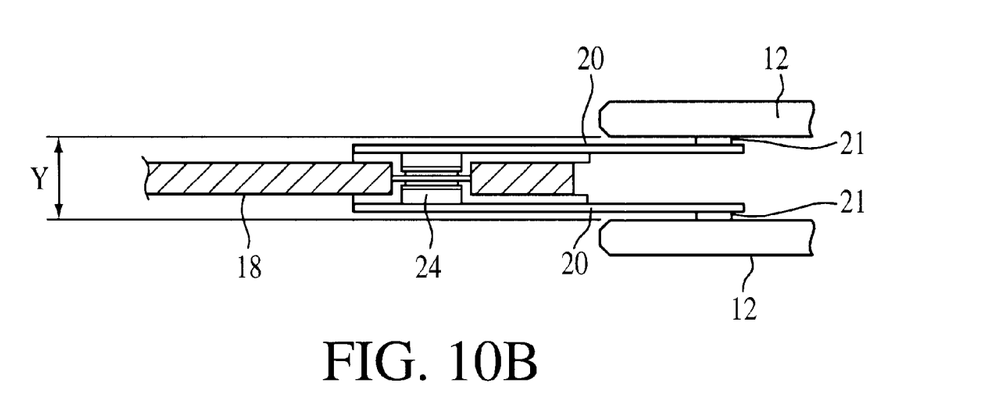

FIG. 10(A) is a diagram depicting a portion of a disk drive according to a third embodiment. While it is assumed that the magnetic disk drive according to the first and second embodiment accommodates only one magnetic disk 34, the magnetic disk shown in FIG. 10(A) accommodates a plurality of magnetic disks 34. FIG. 10(B) is a diagram depicting a conventional disk drive 11 accommodating a plurality of magnetic disks 12.

In the magnetic disk drive shown in FIG. 10(A), a plurality of arms 39 are fitted to the shaft and each arm has a gimbal 40a attached by welding to the upper major surface thereof, and a gimbal 40b attached by welding to the lower major surface thereof. Magnetic heads 41a and 41b are fitted at the end of the gimbals 40a and 40b, respectively, so that the surface of a first magnetic disk 34 that the magnetic head 41 a faces is opposite to the surface of a second magnetic disk 34 that the magnetic head 41b faces.

By fitting the gimbals 40a and 40b to the arm 39 by welding, it is possible to reduce the thickness of the arm 39 and to reduce the interval X between the magnetic disks 34. This reduction in the thickness of the disk drive can be added to the effect achieved by using the base 33 and the cover 32 of the first and second embodiments. For example, the thickness of the entirety of the disk drive accommodating two magnetic disks 34 may be about 10.5 mm. The conventional gimbal 20 is fitted by a caulking 24 to the arm 18. The thickness of the caulking 24 determines the interval Y between the magnetic disks 12.

The magnetic disk drive according to the present invention is thinner than the conventional magnetic disk drive by a difference between the interval Y and the interval X, plus by respective differences between the conventional cover and the cover of the present invention and between the conventional base and the base of the present invention. Using a flat countersunk head screw to be threaded into the holes of the cover 32 and the base 33 contributes to making the magnetic disk drive compact.

While the foregoing description assumes that the first through third embodiments are applied to a magnetic disk drive, the embodiments described may also be applied to a magneto-optic disk drive and the like. The present invention is not limited to the above described embodiments, and variations and modifications may be made without departing from the scope of the present invention.

I claim:

1. A storage device for reading information from or writing information to a recording medium using a head movable over a recording surface of the recording medium and an information accessing mechanism located within a housing formed by a base and a cover, wherein said base and said cover are each provided with a plurality of beams on an interior surface thereof, said beams defining at least one opening in each of said base and said cover, each said opening being covered by at least one seal member;

wherein a first seal member is provided outside said cover so as to cover said at least one opening in said cover, and a second seal member is provided outside said base so as to cover said at least one opening in said base.

2. A storage device according to claim 1, wherein said plurality of beams are formed so as to extend between a periphery of the device and a center portion of the device.

3. A storage device according to claim 1, wherein at least one of said base and said cover is formed of a metal made by one of forging, casting, press-fitting and extrusion.

4. A storage device according to claim 1, wherein one of said base and said cover is formed of a plastic by one of molding and extrusion.

5. A storage device according to claim 1, wherein at least one of said first seal member and said second seal member is a control circuit board for controlling the device.

6. The storage device as claimed in claim 5, said control circuit board has electronic components mounted thereon and located in respective openings formed in said base.

7. The storage device as claimed in claim 5, wherein a hermetically sealing member is provided on a mounting surface of said control circuit board.

8. A storage device according to claim 1, wherein said recording medium is a disk medium, and wherein said storage device further comprises means for rotating said disk medium, said rotating means being supported by said base.

9. A storage device according to claim 8, wherein said rotating means is supported by said cover and said base.

10. A storage device according to claim 8, further comprising translating means rotated by translation driving means, said translating means being fitted to said base, said head being secured to said translating means.

11. A storage device according to claim 10, wherein at least one said beam is located between said rotating means and said translating means.

12. A storage device according to claim 10, wherein said rotating means, said translating means and said translation driving means are spaced from the beams.

13. A storage device according to claim 12, wherein wiring connections are supplied to the translation driving means by a flexible printed circuit board positioned in one of the openings so as to extend along an associated beam.

14. A storage device according to claim 1, wherein said head is secured to translating means rotated by translation driving means, said translating means being fitted to said base.

15. A storage device according to claim 14, wherein said translating means is fitted to said cover and said base.

16. A storage device according to claim 1, wherein a third seal member is provided around a periphery of a joint defined between said base and said cover.

* * * * *